United States Patent Office 3,528,692
Patented Sept. 15, 1970

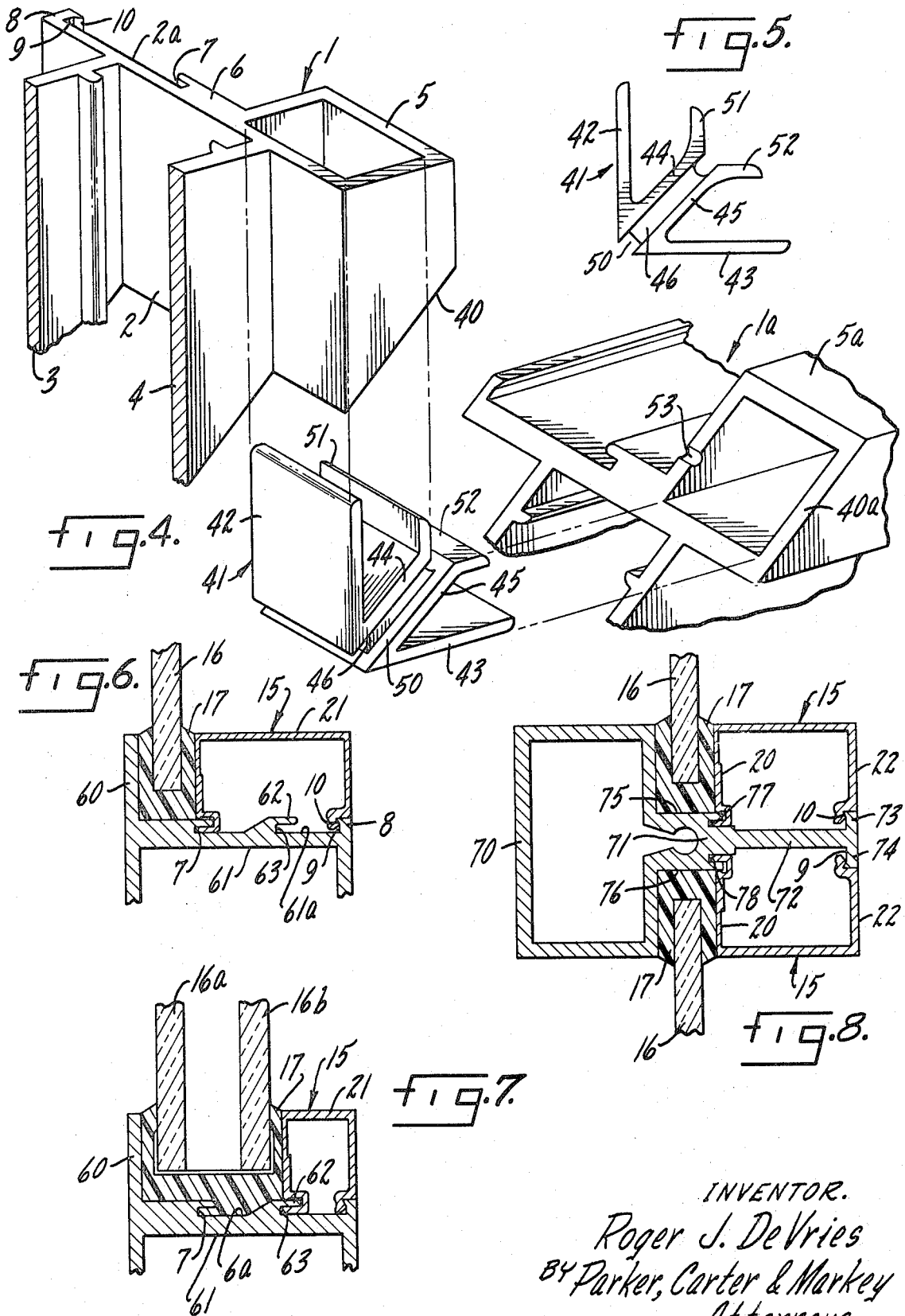

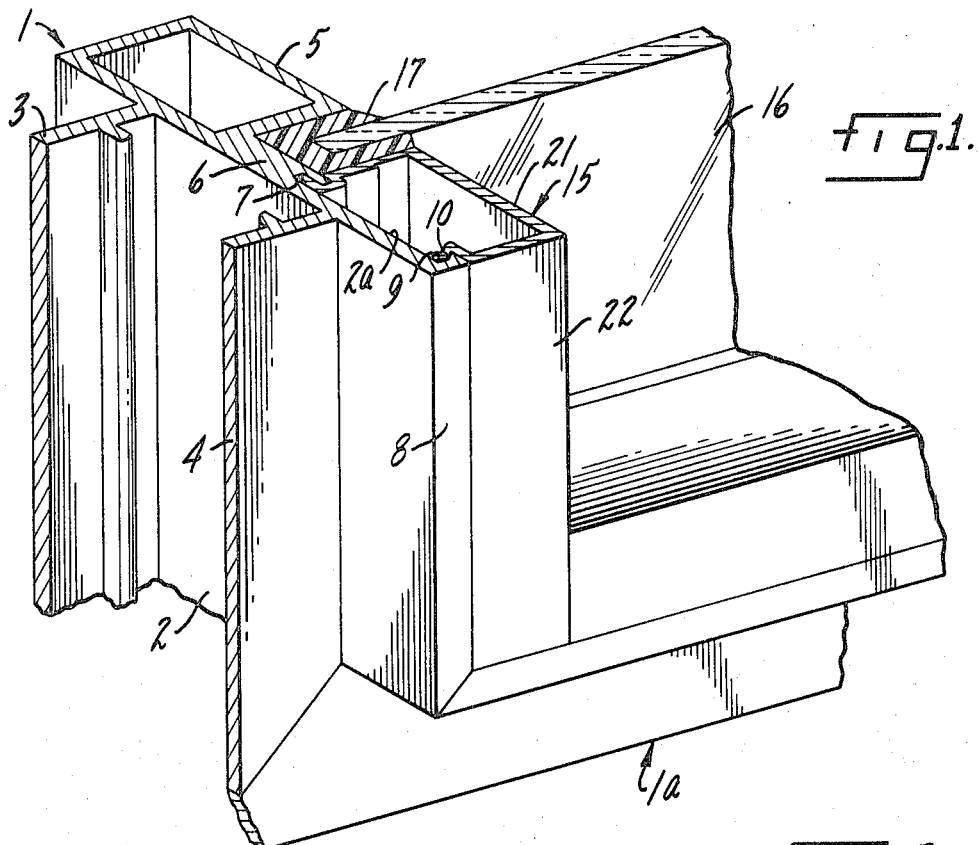
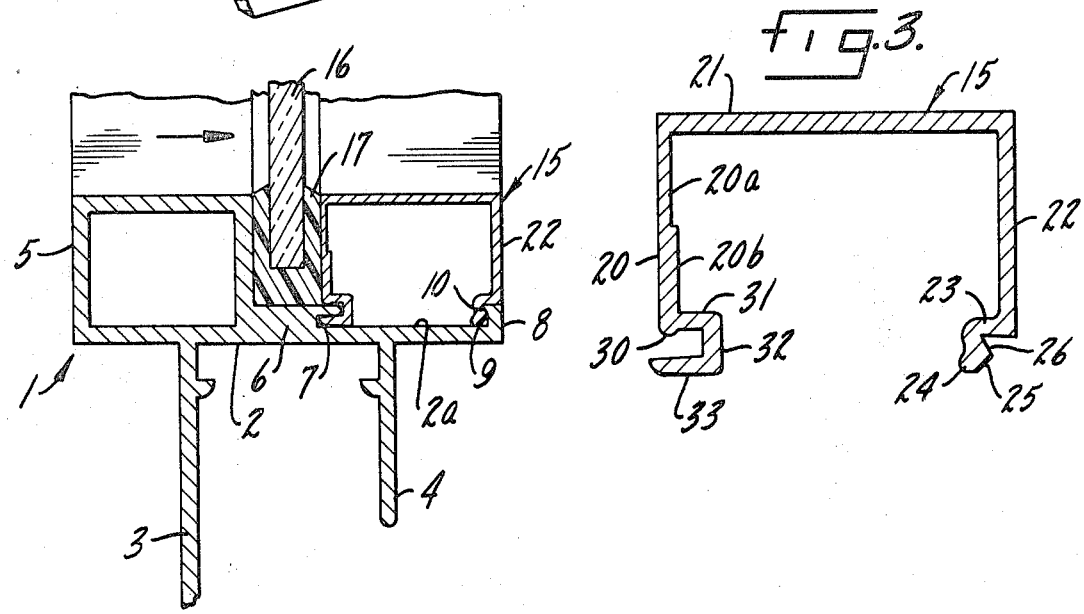

3,528,692
WINDOW FRAME ASSEMBLY
Roger J. De Vries, Kalamazoo, Mich., assignor to North American Aluminum Corporation, Kalamazoo, Mich., a corporation of Delaware
Filed Oct. 28, 1968, Ser. No. 770,972
Int. Cl. E06b 3/60; F16b 7/00
U.S. Cl. 287—189.36                    2 Claims

ABSTRACT OF THE DISCLOSURE

A window frame assembly including a glazing bead effective to resist maximum wind pressures and capable of ease in installation and including a key member joining the frame elements receptive of the bead.

SUMMARY OF THE INVENTION

A window frame including a key element joining portions thereof and a method of joining the same and a frame and bead assembly including cooperating elements whereby the bead may be snapped into place and whereby wind resistance is greatly increased. The cooperating elements include an extended overlapping forward flange and configurations on the bead facilitating a snap-in rear engagement between the frame and the bead, the rear engagement being strengthened by wind against the window pane in the frame.

This invention relates to windows and window frame installations. One purpose of the invention is to provide a window capable of maximum wind resistance.

Another purpose is to provide a means and method of joining window frame elements of maximum simplicity and effectiveness.

Another purpose is to provide means forming a leak-proof window and frame assembly.

Another purpose is to provide a window frame having a glazing bead installable by snap-in action.

Another purpose is to provide a window pane, frame and glazing bead assembly capable of maximum resistance to dislodgement of the glazing bead in response to wind forces against the window pane.

Other purposes will appear from time to time during the course of the specification and claims.

BRIEF DESCRIPTION OF THE DRAWINGS

The invention is illustrated more or less diagrammatically in the accompanying drawings wherein:

FIG. 1 is a partial perspective view with parts in cross section and parts broken away;

FIG. 2 is a top view in cross section of FIG. 1;

FIG. 3 is a detail view in cross section;

FIG. 4 is a partial perspective view with parts in exploded position;

FIG. 5 is a detail view;

FIG. 6 is a cross-sectional view of a modified form of the invention;

FIG. 7 is a cross-sectional view of a modified form of the invention;

FIG. 8 is a cross-sectional view of a further modified form of the invention.

DESCRIPTION OF THE PREFERRED EMBODIMENT

Referring now to the drawings, and particularly to FIG. 1, the numeral 1 generally designates a window frame. The frame 1 includes a base wall or perpiheral, lateral portion 2. The outer surface of wall 2 has extending therefrom spaced attaching legs 3, 4. It will be understood that the attaching legs 3, 4 may take a variety of forms and are shown in part herein for clarity, the legs 3, 4 being suitably secured to an appropriate building (not shown).

The opposite surface 2a of wall 2 has, as shown in the drawings, a forward, fixed, external bead configuration which, as it appears in FIG. 1, takes the form of a hollow elongated rectangle 5 formed integrally with the wall 2. Intermediate the outer and inner edges of wall 2 is the central thickness or pad 6 extending substantially the length of wall 2.

A rearwardly open elongated groove 7 undercuts the pad 6 throughout its length. At the inner edge of wall 2 is the angularly disposed flange 8 spaced from and opposing the groove 7, the flange 8 having an inner surface 9 adjacent and perpendicular to the inside surface 2a of wall 2 and having an inwardly inclined offset surface 10 joining the surface 9.

Carried in the groove 7 and against surface 9, 10 is a glazing bead 15. In the figures it will be noted that the mating corner segments of glazing beads 15, frames 1 and beads 5 are illustrated. It will be understood that two corresponding sets of corner segments with conjoining intermediate portions are provided with the normal window frame in known manner.

A window pane 16 has its peripheral edge received between fixed bead 5 and glazing bead 15, a supply of sealant material 17 being provided between the peripheral edge surfaces of pane 16 and the inner, opposed, spaced flat wall surfaces of beads 5, 15 and between the sides of pane 16 and the pad 6 spaced therefrom.

Referring now to FIGS. 2 and 3, it will be observed that the glazing bead 15 is an elongated integral piece, generally U-shaped in cross section and including a forward wall 20 having a relatively flat forward surface. Extending rearwardly from the forward wall 20 is a top wall 21. Depending from the rear edge of wall 21 is a rear wall 22. The wall 22 terminates in an inwardly offset portion 23 from which depends a snap-action foot portion 24. Portion 24 has an inclined camming surface 25 and a reverse-inclined lock portion 26 formed and adapted for locking engagement with the surface 10 on frame 1.

Wall portion 20 has a ridge 30 formed along its lower edge and an inwardly extending flange portion 31 extending therefrom and in a plane slightly above the plane of ridge 30. The flange 31 turns downwardly in a portion 32 paralleling the wall 20 and portion 32 extends again forwardly to provide a bayonet or locking flange portion 33 formed and adapted for sliding reception within groove 7 of frame 1. It will be observed that the wall 20 has a reduced or thinner upper portion 20a and a thicker or normal portion 20b, the portion 20b being of a thickness substantially identical with that of the walls 21, 22 and segments 31, 32, 33, 23, 24.

Referring now to FIG. 4, it will be observed that the rectangular fixed forward bead portion of frame 1 has a chamfered end edge 40. The cooperating fixed bead portion 5a of a cross frame 1a has a similarly chamfered mating edge 40a. A key member 41 is provided for positioning, sealing and joining the fixed beads 5, 5a. As may be seen from FIGS. 4 and 5, the key 41 includes perpendicularly disposed outer wall segments 42, 43. Adjacent edges of walls 42, 43 have extending inwardly, angularly therefrom wall segments 44, 45, respectively. The wall segments 44, 45 are joined by an integral intermediate segment 46. It will be observed that the segment 46 is of less planar extension than the inner surfaces of walls 44, 45 in all four directions, thus creating the groove or peripheral slot 50. The inner edges of walls 44, 45 include angularly disposed end portions 51, 52, respectively, the portions 51, 52 spacedly paralleling the wall segments 42, 43, respectively. As may be best seen in FIG. 4, the walls 42, 43, 44, 45 and 51, 52 have lateral extensions only slightly less than the area within the rectangular fixed hollow bead 5, 5a for snug sliding reception therewithin.

Formed in the edge of the inner wall surfaces of the beads 5, 5a, as may be best seen with respect to bead 5a in FIG. 4, is a groove 53. It will be understood that a corresponding groove 53 (not shown) is formed in the mating edge 40 of bead 5 for cooperation with groove 53 to form an aperture. The aperture formed by the grooves 53 is aligned with the groove 50 in key 41 when the key 41 is positioned within the mating end segments of beads 5, 5a, the key walls 42, 51 having entered bead 5 and walls 43, 52 having entered bead 5a. The aperture formed by grooves 53 thus provides for injection of sealant material into the groove 50 and precisely behind the juncture point of chamfered mating edges 40, 40a of beads 5, 5a.

Referring now to FIGS. 6 and 7, it will be observed that the forward fixed bead 5 of FIG. 1 has been replaced by a single fixed wall 60 upstanding from the outer edge of a frame base wall 61. A forward bead 60 may be employed, for example, in association with a rotatable window employing flexible sealing strips (not shown). It will be further observed that the inner surface 61a, corresponding in location to the surface 2a of FIG. 1, has formed intermediate its outer and inner edges and between its groove 7 and surface 9, 10 a rise 62 forming along its rear edge the undercut or groove 63 paralleling and lying in the plane of groove 7. It will be realized that the rise 62 may be provided intermediate groove 7 and flange 8 of the structure of FIGS. 1–5 and 8 without departing from the nature and scope of the invention. In FIG. 6 the glazing bead 15 has an upper wall portion 21 sufficient to bridge the area between the forward groove 7 and frame flange 8 and a single window pane 16 is received in the sealant 17 substantially filling the space between fixed bead 60 and bead 15.

In FIG. 7 the window frame corresponds to that of FIG. 6. It will be observed, however, that a double window pane structure formed of spaced panes 16a, 16b is received within the wider area provided by a diminished glazing bead 15. The sealant 17 thus fills the space between beads 60 and 15 and within the groove 7 and on the surface 6a between the groove 7 and rise 62. The bead 15 has, in the case illustrated in FIG. 7, an upper wall portion 21 of lesser extension than the wall portion 21 shown in the earlier figures and the forwardly extending slide-lock flange 33 of the bead 15 in FIG. 7 is received within the groove 63 rather than within the groove 7.

In the structure of FIG. 8 a mullion or center window frame member 70, of hollow, rectangular configuration, has extending intermediate its rear surface an elongated keylike frame structure 71. The key structure 71 includes a rearwardly extending base wall 72 having perpendicularly disposed, oppositely directed flanges 73, 74 corresponding in cross-sectional configuration to the flanges 8 and having inner surfaces corresponding to surfaces 9, 10 of frame 1. Similarly, the intermediate key portion 71 has oppositely disposed pad surfaces 75, 76, the inner longitudinal edges of which are undercut to form grooves 77, 78, respectively, the grooves 77, 78 corresponding to grooves 7 of frame 1. Received within the grooves 77, 78 and in locking engagement with the flanges 73, 74 are a pair of glazing beads 15. Within the spaces defined by the external rectangle 70, pads 75, 76 and the forward wall sections 20 of the beads 15 is the sealant 17 and peripheral portions of spaced, aligned window panes 16.

The use and operation of the invention are as follows:

It will be realized that four main frame segments, such as the segments 1, 1a shown in FIG. 1, are joined to form the full window frame. A supply of sealant is placed within the rectangular fixed forward beads 5 at their mating end portions. Adjacent, mating frame segments 1, 1a are then slid over the appropriate angularly disposed wall portions of the key 41. With the chamfered edges 40, 40a in contact, a supply of sealant is injected under pressure through the aperture formed of mated grooves 53 to fill the rectangular slot or groove 50 which, with the key 41 thus fully inserted, is in alignment with the mating end surfaces of the beads 5, 5a.

Thereafter a supply of a seal S1, which may take the form of layers of tape, putty or other suitable glazing material, is positioned on pad 6 and against the rear wall surface of the bead 5, the pane 16 is placed in position, suitable supporting plugs or blocks (not shown) being spaced along pad 6. The glazing beads 15 of the invention are then snapped vertically and horizontally into place. The bead 15 has its flange 33 placed along the surface 2a and moved toward interpenetrating engagement with the groove 7. With the flange 33 in the groove 7, the rear portion of the bead 15 is pressed downwardly to bring the chamfered surface 25 into camming engagement with the flange 8 of frame 1. The thinned or reduced wall portion 20a of the forward wall 20 of bead 15 permits sufficient flexibility to enable the surface 25 to cam the portion 24 inwardly and to permit the resulting snap-action engagement of the foot 24 with the flange 8 and the locking engagement of the inclined surface 26 with the inclined surface 10.

With the window frame of the invention thus constructed, external wind forces, such as those indicated by the arrow in FIG. 2, produce a rearward force on the bead 15. The flange 33 and groove 7 are of sufficient extension to permit relative movement toward disengagement thereof without in fact causing such disengagement. Rearward forces thus exerted on the bead 15 tend to seat the bead 15 and to further increase the engagement of foot 24 and flange 8.

The embodiments of the invention in which an exclusive property or privilege is claimed are defined as follows:

1. A window frame assembly including a plurality of elongated, hollow, empty members substantially rectangular in cross-sectional configuration, each adjacent pair of said hollow members having chamfered, mating end surfaces and a key element, said key element having angularly disposed wall surfaces positioned and dimensioned for snug reception in and in contact with the inner surfaces of two mated end portions of said pair of hollow members, said key having a circumferential groove therein, said groove lying beneath all of the mated end surfaces of said pair of hollow members when said hollow members are joined, sealant material filling said groove, and an aperture in said hollow members positioned for delivery of said sealant material to fill said groove from a point externally of said hollow members, whereby said mating end surfaces are sealed under pressure from the inside, said contacting key and member surfaces impeding progress of sealant material out of said groove.

2. The structure of claim 1 wherein said aperture is formed of mating grooves positioned in the end surfaces of said hollow members.

References Cited

UNITED STATES PATENTS

| | | | |
|---|---|---|---|
| 961,992 | 6/1910 | Underwood | 287—20.92 |
| 3,183,560 | 5/1965 | Brichard | 52—656 |
| 2,546,962 | 5/1951 | Best. | |
| 1,703,092 | 2/1929 | Bishop | 52—475 |
| 3,196,998 | 7/1965 | Owen | 52—498 |
| 3,203,053 | 8/1965 | Lane | 52—501 |
| 3,321,880 | 5/1967 | Ferrell | 52—501 |
| 3,334,463 | 8/1967 | Muessel | 52—501 |
| 3,352,078 | 11/1967 | Neal | 52—397 |

OTHER REFERENCES

German printed application No. 1,100,919, March 25, 1959, Fuchs.

JOHN E. MURTAGH, Primary Examiner

U.S. Cl. X.R.

52—127, 501, 656